(No Model.)

A. A. BEVIN.
BICYCLE BELL CLAMP.

No. 539,764. Patented May 21, 1895.

Witnesses:
Arthur B. Jenkins.
J. Stern.

Inventor:
Abner A. Bevin.
By Chas. L. Burdett,
Attorney.

United States Patent Office.

ABNER A. BEVIN, OF EAST HAMPTON, CONNECTICUT, ASSIGNOR TO THE BEVIN BROTHERS MANUFACTURING COMPANY, OF SAME PLACE.

BICYCLE-BELL CLAMP.

SPECIFICATION forming part of Letters Patent No. 539,764, dated May 21, 1895.

Application filed February 27, 1895. Serial No. 539,876. (No model.)

*To all whom it may concern:*

Be it known that I, ABNER A. BEVIN, a citizen of the United States, and a resident of East Hampton, in the county of Middlesex and State of Connecticut, have invented certain new and useful Improvements in Clamps for Bicycle-Bells, of which the following is a full, clear, and exact description, whereby any one skilled in the art can make and use the same.

The object of my invention is to provide a bicycle bell or like article with a clamp device by means of which it may be secured to a fixed part of the frame of the bicycle or other vehicle, and to this end my invention consists in the details of the several parts making up the device as a whole and in the combination of such parts as more particularly hereinafter described and pointed out in the claims.

Figure 1:
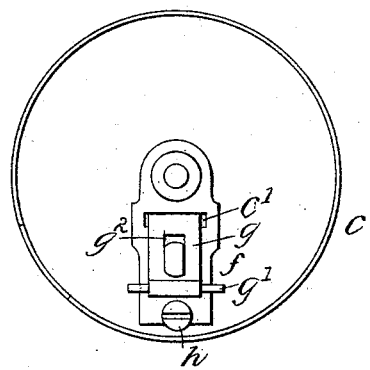
Figure 2:
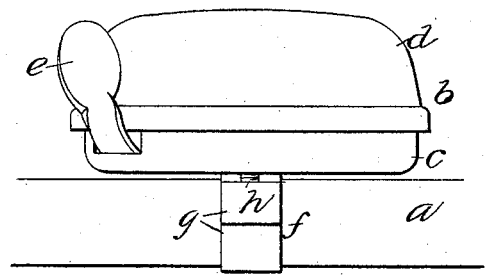
Figure 3:
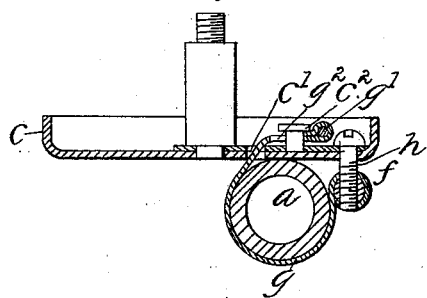

Referring to the drawings, Figure 1 is a detail top or plan view of the base of a bicycle-bell provided with my improved clamp. Fig. 2 is a detail edge view of the bell, showing the clamp in front view. Fig. 3 is a detail view in vertical cross-section through the base of the bell and showing details of construction of the clamp.

My invention is particularly adapted and intended for use in connection with a bicycle bell which is usually provided with a fastening for removably securing it to the handle bar of a bicycle, and in the accompanying drawings the letter $a$ denotes the handle of a bicycle; $b$, a bicycle bell having a base $c$, a gong $d$, and a handle $e$ of mechanism for sounding the bell.

A clamp $f$ is connected to the base of the bell and it comprises a flexible band $g$ of thin metal attached at one end to the base of the bell and at the other to a screw $h$ or like means for drawing the free end of the band forcibly toward the base for the purpose of embracing securely with the band the handle bar or like part around which the band extends.

In my improved form of clamp the band $g$ extends through a narrow slot $c'$ in the base of the bell, the slot being substantially of the same width as the band which has on the inner end a cross piece $g'$ which extends beyond the edges of the slot and holds the band against further movement outward. In addition to the cross piece forming a stop there is also an opening or socket $g^2$ in the substance of the band at a distance from the end and this is adapted to engage a stud $c^2$ fixed on the base of the bell at a distance back of the slot $c'$, and by engaging the band with this stud it can be shortened so as to adjust it to a smaller size of handle. The free end of the band is provided with a thickened portion which is adapted to receive a screw or bolt which extends into a socket in the base $c$, the parts being provided with inter-engaging screw threads so that by turning the bolt or screw the band can be firmly clamped about the handle $a$ or a fixed part of the frame of the bicycle.

My improved band clamp constructed substantially as described is readily applied to a bicycle bell the base of which requires no special fixtures, attachments or changes other than the slot, the stud and the socket piece described. In place of the stud and the socket duplicate studs on opposite sides of the band may be provided and the ends of the stop bar may be arranged to engage the pins which are placed at regular distances from the slot.

I claim as my invention—

1. In combination with the base of a bell having a slot for the passage of a clamping band, a flexible clamping band extending through the slot in the base and having lateral projections on the inner end extending beyond the edges of the slot, a stud located inside the base and adapted to engage the strap, and a screw bolt for adjustably securing the outer end of the band to the base, all substantially as described.

2. In combination with the base of a bell or like article having a slot therethrough, a flexible clamping band having one end extending through the slot in the base with lateral projections on the inner end extending beyond the edges of the slot, a socket in the substance of the band at a distance from the end, a stud located inside the base of the bell and adapted to engage the socket in the band, and a screw bolt for securing the outer end of the band to the base, all substantially as described.

ABNER A. BEVIN.

Witnesses:
CHAS. D. CROSBY,
GEO. K. WHITE.